(12) United States Patent
Koop (10) Patent No.: US 10,495,137 B2
(45) Date of Patent: Dec. 3, 2019

(54) BICYCLE CONTROL DEVICE

(71) Applicant: Shimano Europe B.V., Eindhoven (NL)

(72) Inventor: Jos Koop, Eindhoven (NL)

(73) Assignee: SHIMANO EUROPE B.V., Eindhoven (NL)

(*) Notice: Subject to any disclaimer, the term of this patent is extended or adjusted under 35 U.S.C. 154(b) by 0 days.

(21) Appl. No.: 15/936,332

(22) Filed: Mar. 26, 2018

(65) Prior Publication Data

US 2019/0293110 A1    Sep. 26, 2019

(51) Int. Cl.
| | | |
|---|---|---|
| *F16C 1/12* | (2006.01) | |
| *B62K 23/06* | (2006.01) | |
| *F16C 1/22* | (2006.01) | |
| *B62L 3/02* | (2006.01) | |
| *B62M 25/04* | (2006.01) | |

(52) U.S. Cl.
CPC ............... *F16C 1/12* (2013.01); *B62K 23/06* (2013.01); *B62L 3/02* (2013.01); *F16C 1/223* (2013.01); *B62M 25/04* (2013.01)

(58) Field of Classification Search
CPC ........ B62K 23/06; B62K 23/02; B62M 25/04; B62M 25/02; B60T 7/102; B62L 3/02; F16C 1/18; F16C 1/12; F16C 1/101; G05G 1/04; Y10T 74/20402; Y10T 74/2042; Y10T 74/20426; Y10T 74/20438
See application file for complete search history.

(56) References Cited

U.S. PATENT DOCUMENTS

| | | |
|---|---|---|
| 2014/0013875 A1 | 1/2014 | Neeley |
| 2017/0002855 A1 | 1/2017 | Hermansen et al. |

FOREIGN PATENT DOCUMENTS

| | | | |
|---|---|---|---|
| CN | 205574191 U | 9/2016 | |
| EP | 3165436 A1 * | 5/2017 | ............... B62J 1/06 |
| EP | 3279073 A1 | 2/2018 | |

* cited by examiner

*Primary Examiner* — Daniel D Yabut
(74) *Attorney, Agent, or Firm* — Alleman Hall Creasman & Tuttle LLP (57) ABSTRACT

A control device for a human powered vehicle includes a base member configured to clamp a handlebar. The base member defines a clamping axis in a mounted state where the base member clamps the handlebar. The control device includes an operating member configured to be arranged by sliding movement on the base member between a rest position and an operated position in a circumferential direction of the base member. The operating member has a connecting portion to which a control cable is connected. The operating member is removably arranged on the base member, and the operating member is positioned on the base member with a tension of the control cable. The control device includes an inner member configured to be accommodated in the base member and to be arranged around the handlebar such that the operating member is at least partly arranged between the base member and the inner member.

19 Claims, 7 Drawing Sheets

BICYCLE CONTROL DEVICE

BACKGROUND

Bicycling is becoming an increasingly popular form of recreation as well as a means of transportation. Moreover, bicycling has become a very popular competitive sport for both amateurs and professionals. At any skill level, bicycle components and accessories may be useful to a rider for improving the bicycling experience. Control devices and components, while offering a rider customization, may vary widely in design due to balancing efficiency, space, and operation. Other important factors relevant to control device and component design include placement on the bicycle and mounting design. As riders may vary in preferences for bicycle customization, control devices may be more successful if offering a wider level of appeal to bicyclists in general. Additionally, a control device may benefit in terms of longevity and compactness from more efficient design with regard to internal aspects less likely to have immediate impact on a rider's preferences.

SUMMARY

A control device for a human powered vehicle is disclosed herein. In accordance with a first aspect of the present invention, the control device comprises a base member and an operating member. The base member is configured to clamp a handlebar. The base member defines a clamping axis in a mounted state where the base member clamps the handlebar. The operating member is configured to be arranged by sliding movement on the base member between a rest position and an operated position in a circumferential direction of the base member. The operating member has a connecting portion to which a control cable is connected. The operating member is removably arranged on the base member. The operating member is positioned on the base member with a tension of the control cable.

With the bicycle control device according to the first aspect, it is possible to maintain the assembly of the control device and its position on the handlebar. The operating member may independently move circumferentially within the base member such that the control device operates to a desired rotational degree.

In accordance with a second aspect of the present invention, the control device according to the first aspect further comprises an inner member configured to be accommodated in the base member and to be arranged around the handlebar such that the operating member is at least partly arranged between the base member and the inner member.

With the bicycle control device according to the second aspect, it is possible to fix the control device to the handlebar by fitting the inner member within the operating member, thus providing a mechanism by which a tightening force between the inner member and the operating member is advantageously used to engage the handlebar with the control device. Furthermore, low friction contact between the inner member, operating member, and base member may lower the actuation force needed to operate the control device.

In accordance with a third aspect of the present invention, the control device according to the second aspect is configured so that the base member includes a pair of side surfaces defining a gap therebetween, in which the inner member is arranged.

With the bicycle control device according to the third aspect, it is possible to secure the inner member within the operating member and create space for allowable movement of the operating member.

In accordance with a fourth aspect of the present invention, the control device according to the third aspect is configured so that the pair of side surfaces is configured to restrict an axial movement of the inner member.

With the bicycle control device according to the fourth aspect, it is possible to fix the inner member axially so that the operating member is held to movement only in the circumferential direction in its placement over the inner member.

In accordance with a fifth aspect of the present invention, the control device according to the third aspect or the fourth aspect is configured so that the connecting portion is configured to be slidable within the gap in the circumferential direction.

With the bicycle control device according to the fifth aspect, actuation of the operating member may cause the connecting portion to move within the control device. The operating member may be accessible to a user while the connecting portion of the operating member is held to the interior of the base member to transfer actuation by the user to a rotational movement as the control device is operated.

In accordance with a sixth aspect of the present invention, the control device according to any one of the second aspect to the fifth aspect is configured so that the connecting portion of the operating member is configured to be slidable between an inner circumferential surface of the base member and an outer circumferential surface of the inner member in the circumferential direction.

With the bicycle control device according to the sixth aspect, it is possible to hold movement of the connecting portion of the operating member to rotation between the base member and the inner member. Accordingly, the connecting portion may be guided in its movement with a minimal number of components while maintaining a compact shape of the control device around the handlebar.

In accordance with a seventh aspect of the present invention, the control device according to any one of the first aspect to the sixth aspect is configured so that the base member includes a first slit extending in a first direction parallel to the clamping axis.

With the bicycle control device according to the seventh aspect, it is possible to change the radius of the base member by closing or opening the first slit as the base member is fit to the handlebar and secured in place along the clamping axis of the handlebar. Thus, it may be possible to more easily fit the base member to the handlebar.

In accordance with an eighth aspect of the present invention, the control device according to any one of the second aspect to the seventh aspect is configured so that the inner member includes a second slit extending in a second direction non-parallel to the clamping axis.

With the bicycle control device according to the eighth aspect, it is possible to change the radius of the inner member by closing or opening the second slit as the inner member is accommodated in the base member and arranged around the handlebar. Thus, fitting the inner member within the base member and along the handlebar is facilitated.

In accordance with a ninth aspect of the present invention, the control device according to the seventh aspect is configured so that the inner member includes a protrusion on an outer peripheral surface that is configured to be arranged in the first slit of the base member.

With the bicycle control device according to the ninth aspect, it is possible to secure the inner member within the base member so that the inner member is fixed rotationally within the inner member. This configuration may allow a secured positioning of the inner member with respect to the base member.

In accordance with a tenth aspect of the present invention, the control device according to any one of the first aspect to the ninth aspect further comprises the control cable configured to be inserted into the base member in the circumferential direction.

With the bicycle control device according to the tenth aspect, it is possible to communicate force applied to the operating member during actuation by way of the control cable to a bicycle component that may be controlled by the control device.

In accordance with an eleventh aspect of the present invention, the control device according to any one of the first aspect to the tenth aspect further comprises a cable guide and an adjusting member. The cable guide has a proximate end coupled to the base member, the control cable passing through the cable guide. The adjusting member attaches to the cable guide, and the control cable passes through the adjusting member. The adjusting member is configured to adjust the tension of the control cable.

With the bicycle control device according to the eleventh aspect, it is possible to protect the control cable with the cable guide and maintain a secure entry of the control cable to the base member. It is additionally possible to adjust the tension of the control cable within the cable guide.

In accordance with a twelfth aspect of the present invention, the control device according to any one of the first aspect to the eleventh aspect further comprises a securing element configured to secure the control cable to the operating member.

With the bicycle control device according to the twelfth aspect, the securing member may maintain a connection between the control cable and the operating member such that the operating member communicates by way of applied force with the control cable, however the control cable may maintain some freedom of movement with respect to the securing element.

In accordance with a thirteenth aspect of the present invention, the control device according to any one of the first aspect to the twelfth aspect is configured so that the operating member includes a guiding slot configured to guide the control cable along the circumferential direction.

With the bicycle control device according to the thirteenth aspect, it is possible to accommodate the control cable to a circumferential area within the control device such that the control cable moves efficiently within the control device and does not interfere with other components of the control device.

In accordance with a fourteenth aspect of the present invention, the control device according to any one of the first aspect to the thirteenth aspect is configured so that the operating member is configured to rotate through an angular range equal to or larger than 30° in response to an operation of a user.

With the bicycle control device according to the fourteenth aspect, it is possible to allow the operating member to rotate to an angular degree corresponding to a displacement requisite for control of a particular bicycle component being controlled by the control device.

In accordance with a fifteenth aspect of the present invention, the control device according to any one of the first aspect to the fourteenth aspect is configured so that the operating member includes a user interface portion configured to be at least partly curved.

With the bicycle control device according to the fifteenth aspect, it is possible to configure the operating member with an ergonomic design that facilitates actuation by the user at the user interface portion.

In accordance with a sixteenth aspect of the present invention, the control device according to any one of the first aspect to the fifteenth aspect further comprises a fastener configured to be coupled with the base member such that the base member clamps the handlebar.

With the bicycle control device according to the sixteenth aspect, it is possible to fix the base member to the handlebar and thus the control device to the bicycle in a working position for a rider of the bicycle.

In accordance with a seventeenth aspect of the present invention, the control device according to any one of the first aspect to the sixteenth aspect is configured so that the base member is made of metallic material.

With the bicycle control device according to the seventeenth aspect, the metallic material of the base member may provide strength, rigidity and be light weight.

In accordance with an eighteenth aspect of the present invention, the control device according to any one of the first aspect to the sixteenth aspect is configured so that the operating member is made of a metallic material.

With the bicycle control device according to the eighteenth aspect, the operating member is metallic material and thus provides strength and rigidity, and may be light weight.

In accordance with a nineteenth aspect of the present invention, the control device according to any one of the second aspect to the sixteenth aspect is configured so that the inner member is made of a resin material.

With the bicycle control device according to the nineteenth aspect, it is possible to provide an outer circumferential surface of the inner member along which the operating member may more easily slide due to the material of the inner member.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Example embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Figure 1:
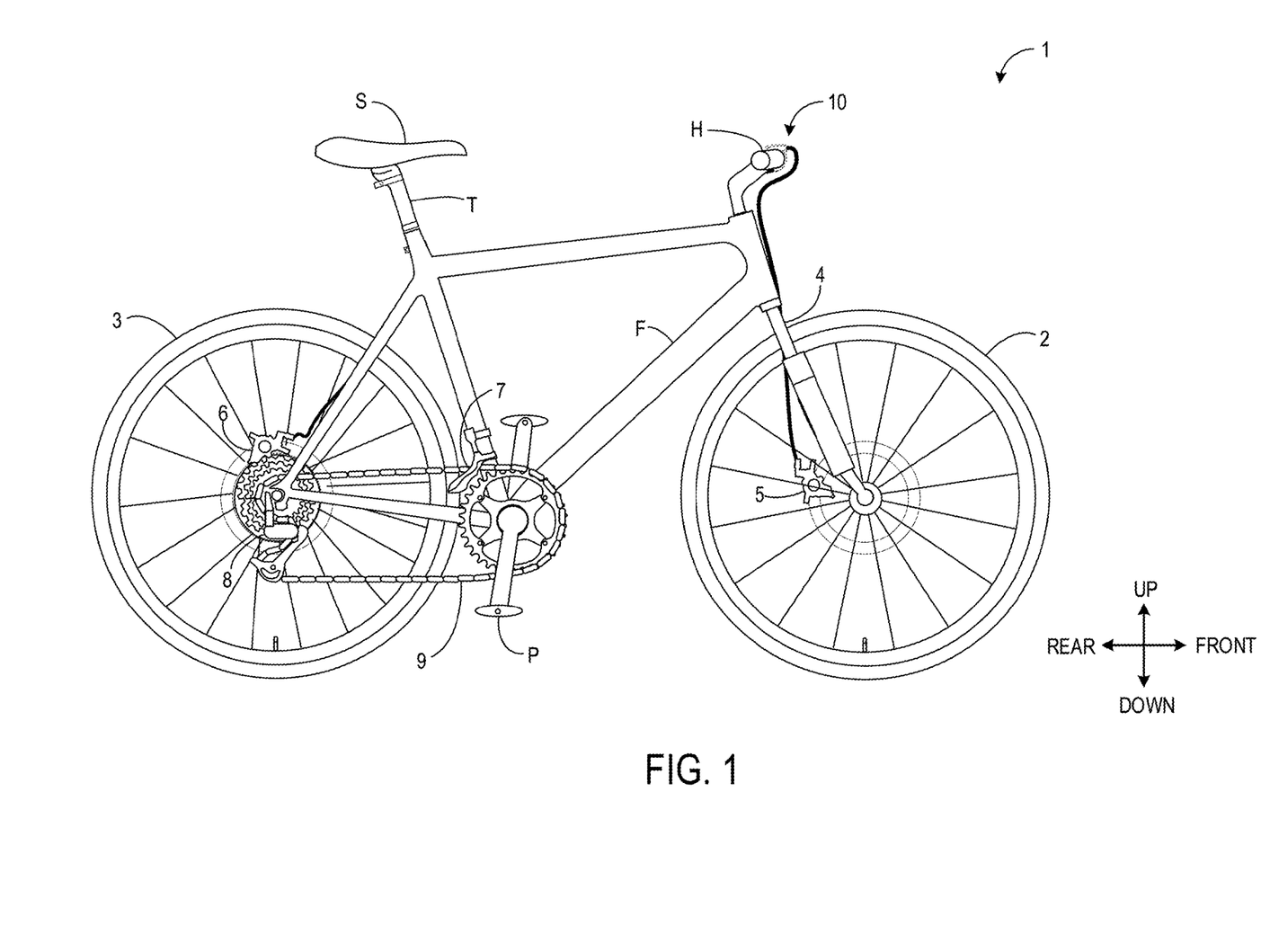
FIG. 1 is a side view of a bicycle having a control device for a human powered vehicle in accordance with an example embodiment.
Figure 2:
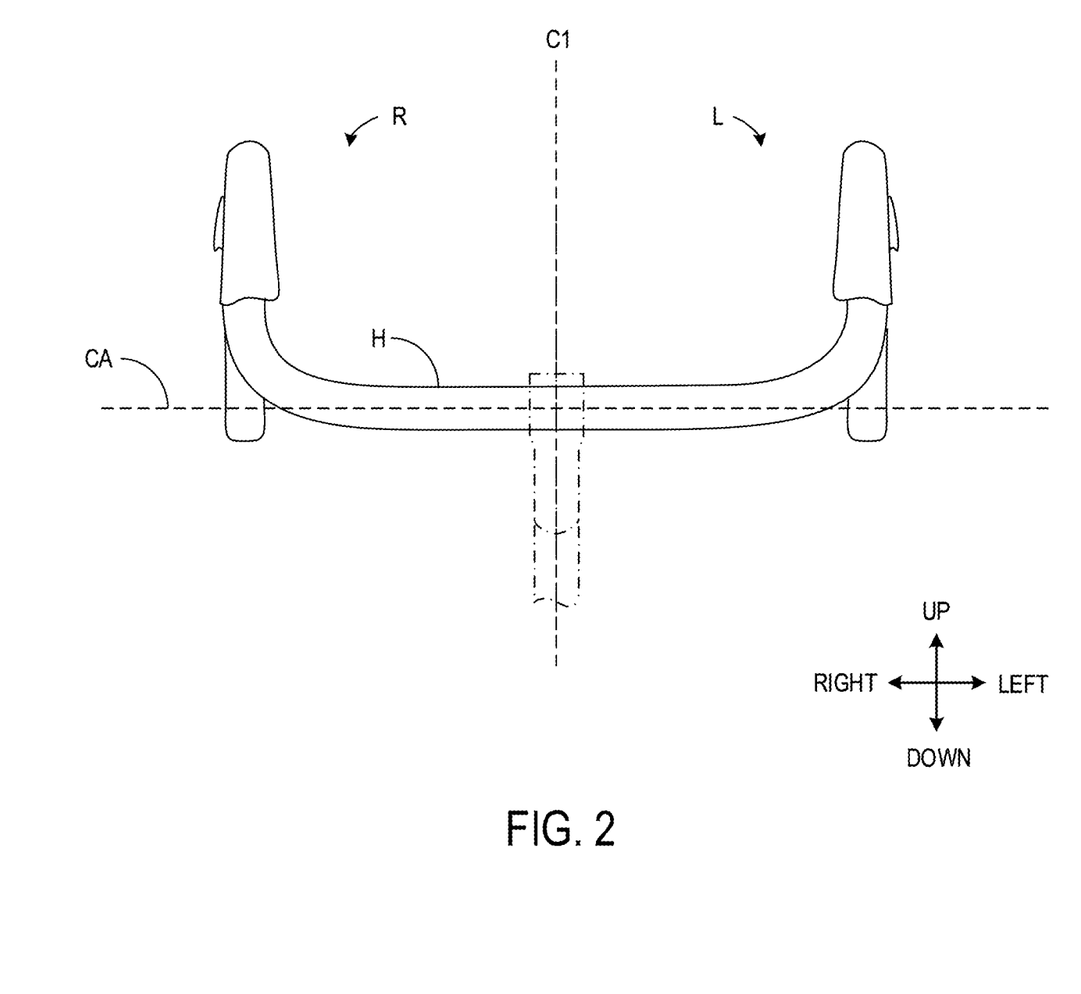
FIG. 2 is a schematic outline of a handlebar of the bicycle of FIG. 1.

Referring initially to FIG. 1, an exemplary bicycle 1 that is a human powered vehicle having a control device 10 in accordance with an example embodiment is illustrated. The bicycle 1 may be, for example, a road type bicycle. Alternatively, the bicycle 1 may be an off-road bicycle such as a cyclocross bicycle or mountain bike. The bicycle 1 includes a handlebar H, front and rear wheels 2 and 3, front fork 4, front and rear brake devices 5 and 6, front derailleur 7, rear derailleur 8, bicycle chain 9, pedals P attached to crank arms, frame F, and seat post T beneath bicycle seat S. As shown in the schematic outline of FIG. 2, the bicycle 1 may have a bicycle center plane C1, the bicycle center plane C1 separating a left side L from a right side R of the bicycle 1. The following directional terms "front," "rear," "forward," "rearward," "left," "right," "transverse," "upward," and "downward," as well as any other similar directional terms, refer to those directions which are determined on the basis of a rider sitting upright on a seat S of the bicycle 1 while facing the handlebar H, for example. Also shown in FIG. 2 is a clamping axis CA along the handlebar H.

The handlebar H may be a drop type handlebar. Alternatively, the handlebar H may be a bullhorn type, flat type, or other type of handlebar. The control device 10 may be mounted on the handlebar H to receive user input from a rider riding the bicycle 1. The brake devices 5, 6 may impart a braking force on one or both of the front and rear wheels 2, 3 in response to the user input. A front fork 4 attaches a front wheel 2 to the frame F. Bicycle seat S atop seat post T may be adjustable in height in response to user input; for example, the seat post T may be telescopically adjustable either by direct manual adjustment or by a control cable. Pedals P on either side of the bicycle 1 are attached to corresponding crank arms. The crank arms are mounted on either side of the frame F at 180 degrees from one another and are connected by a crank axle. The bicycle 1 of the present embodiment is driven by a chain drive transmission system that includes a bicycle chain 9 engaged with one of a cassette of rear sprockets and a front bicycle sprocket. A driving force applied to the pedals P is transferred to the crank arms, which rotate the crank axle and the bicycle sprocket. As the bicycle sprocket rotates, the bicycle chain 9 is driven around the bicycle sprocket and transmits power to the rear wheel 3 to propel the bicycle 1. Other parts of the bicycle 1 are well known and are not described herein.

Figure 3:
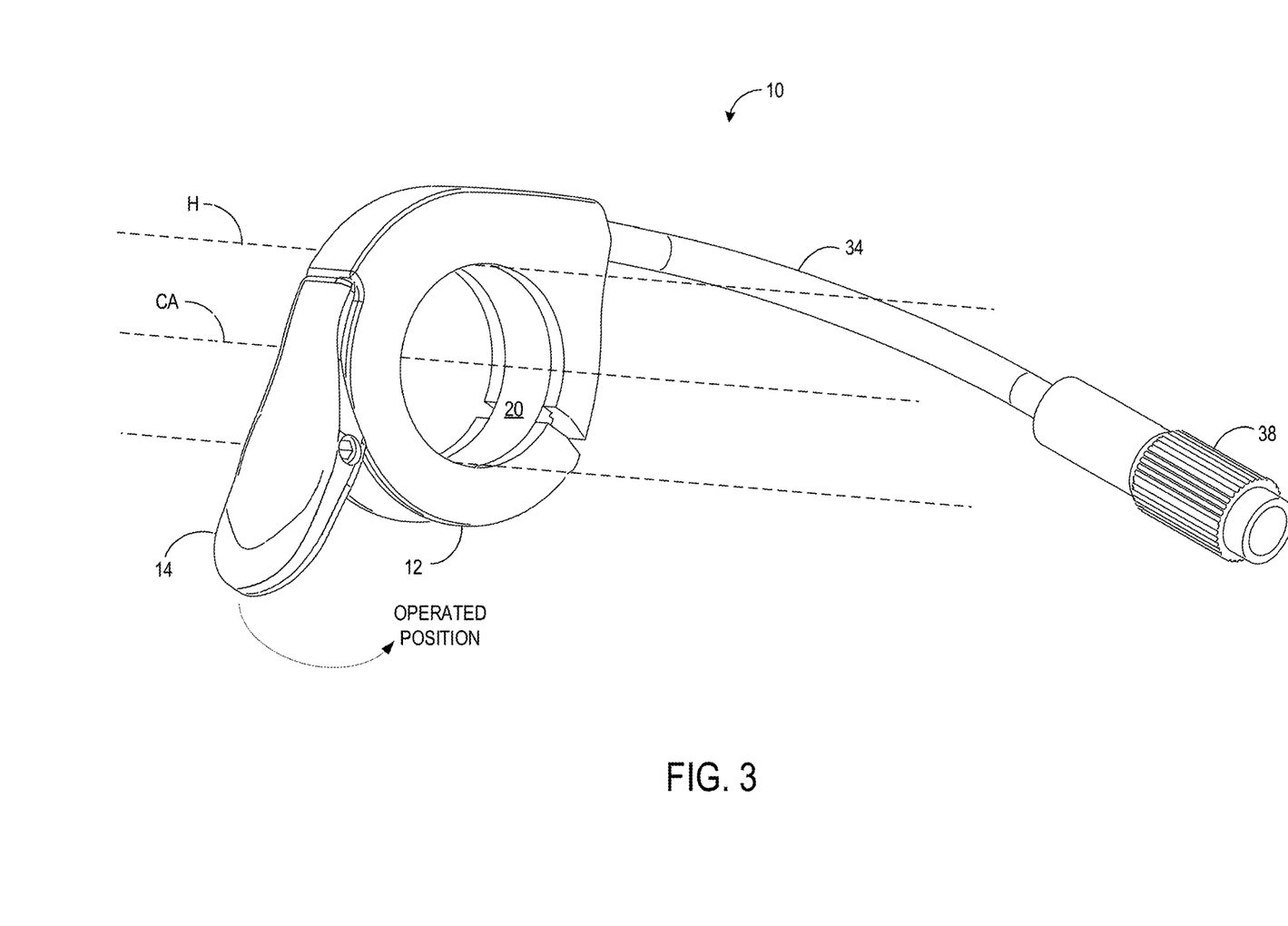
FIG. 3 is a view of the control device from a perspective of a rider looking along a handlebar from a center plane of the bicycle of FIG. 1.

Turning now to FIG. 3, the control device 10 for a human powered vehicle includes a base member 12 configured to clamp the handlebar H. The base member 12 defines the clamping axis CA in a mounted state where the base member 12 clamps the handlebar H. The perspective of the control device 10 shown in FIG. 3 is one of a rider looking along the handlebar H to the left from the center plane C1 of the bicycle. The control device 10 is mountable to left side or right side of the handlebar H according to user preferences respectively. In the embodiment shown in FIG. 3, the clamping axis CA is along the length of the handlebar H. An operating member 14 is configured to be arranged by sliding movement on the base member 12 between a rest position and an operated position in a circumferential direction of the base member 12. In FIG. 3, the operating member 14 of the control device 10 is shown in the rest position with an arrow indicating movement of the operating member 14 to an operated position, in accordance with this embodiment. The operating member 14 is configured to rotate through an angular range equal to or larger than 30° in response to an operation of a user. The range of movement of the operating member 14 may be up to 90° in other embodiments. This rotational range allows the operating member 14 to rotate to an angular degree corresponding to a displacement necessary for control of a particular bicycle component being controlled by the control device 10. In this example embodiment, the rotational angle through which the operating member 14 moves is between 10° and 20°. This range of rotational angle is appropriate for control of an adjustable seat post T. In an alternative embodiment, the rotation of the operating member 14 is configured to control telescopic movement of a bicycle telescopic apparatus.

Figure 4:
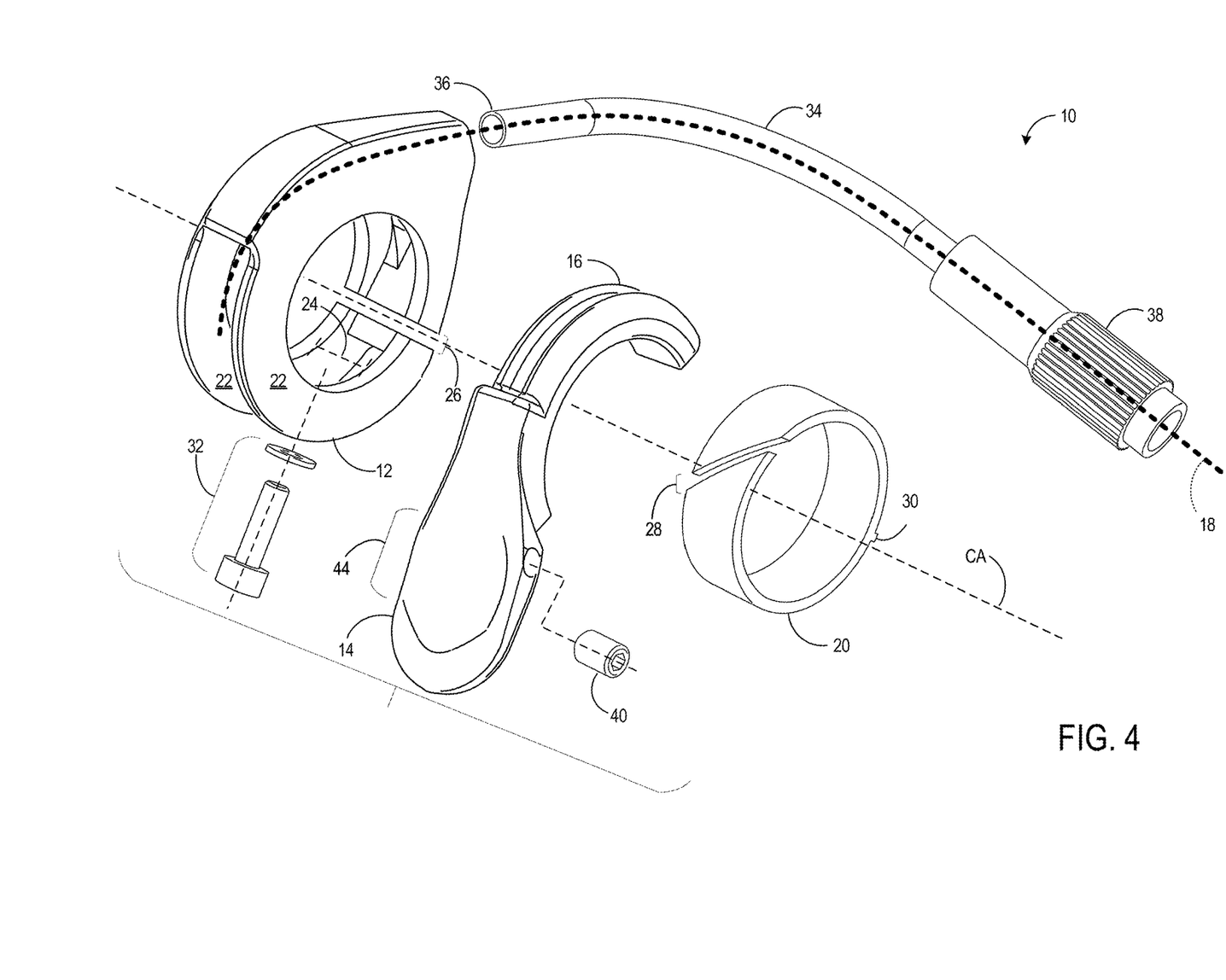
FIG. 4 is an exploded view of the control device of FIG. 3.

Turning now to FIG. 4, an exploded view of the control device 10 is shown. The operating member 14 has a connecting portion 16 to which a control cable 18 is connected. As depicted in FIG. 4, the connecting portion 16 is a part of the operating member 14 that moves over the base member 12 in a circumferential direction of the base member 12. The operating member 14 is removably arranged on the base member 12, and the operating member 14 is positioned on the base member 12 with a tension of the control cable 18. The control cable 18 is indicated in FIG. 4 by a bold dashed line. FIG. 4 shows the path of the control cable 18 through the control device 10. The control cable 18 travels in a circumferential direction of the base member 12 to a position of the operating member 14. In this embodiment, the control device 10 does not includes an internal biasing member such as a leaf or coil spring that would automatically return the operating member to a rest position; rather, bias is provided by the cable and the remotely positioned controlled bicycle component to which the cable is attached.

An inner member 20 is configured to be accommodated in the base member 12 and to be arranged around the handlebar H such that the operating member 14 is at least partly arranged between the base member 12 and the inner member 20. The base member 12 includes a pair of side surfaces 22 defining a gap 24 therebetween, in which the inner member 20 is arranged. FIG. 4 shows the pair of side surfaces 22 of base member 12; the gap 24 is the circumferential space between the pair of side surfaces 22. In assembling the control device 10 according to this embodiment, the inner member 20 is positioned centered inside the base member 12. The base member 12 includes a first slit 26 extending in a first direction parallel to the clamping axis CA. The first slit 26 is shown in FIG. 4. The inner member 20 includes a second slit 28 extending in a second direction non-parallel to the clamping axis CA, which is also shown in FIG. 4. In an alternative embodiment, the second slit 28 may extend in the first direction parallel to the clamping axis CA. The radius of inner member 20 may be changed by closing or opening the second slit 28 as the inner member 20 is fit within the base member 12.

The inner member 20 includes a protrusion 30 on an outer peripheral surface that is configured to be arranged in the first slit 26 of the base member 12. In this embodiment, it is possible to secure the inner member 20 within the base member 12. Subsequently, the base member 12 and the inner member 20 are slid over the handlebar H to a preferred position. The pair of side surfaces 22 is configured to restrict an axial movement of the inner member 20; that is, the pair of side surfaces 22 holds the inner member 20 to the preferred position along the handlebar H such that the inner member 20 may not slide independently along the clamping axis CA. Once in a preferred position on the handlebar H, it is possible to provide a securing of the control device 10 by way of the placement of the inner member 20 held by the protrusion 30 at the first slit 26 of the base member 12 and the changeable radius of inner member 20 due to the second slit 28, thus allowing for a radial force to act in the control device 10.

Figures 5A, 5B:
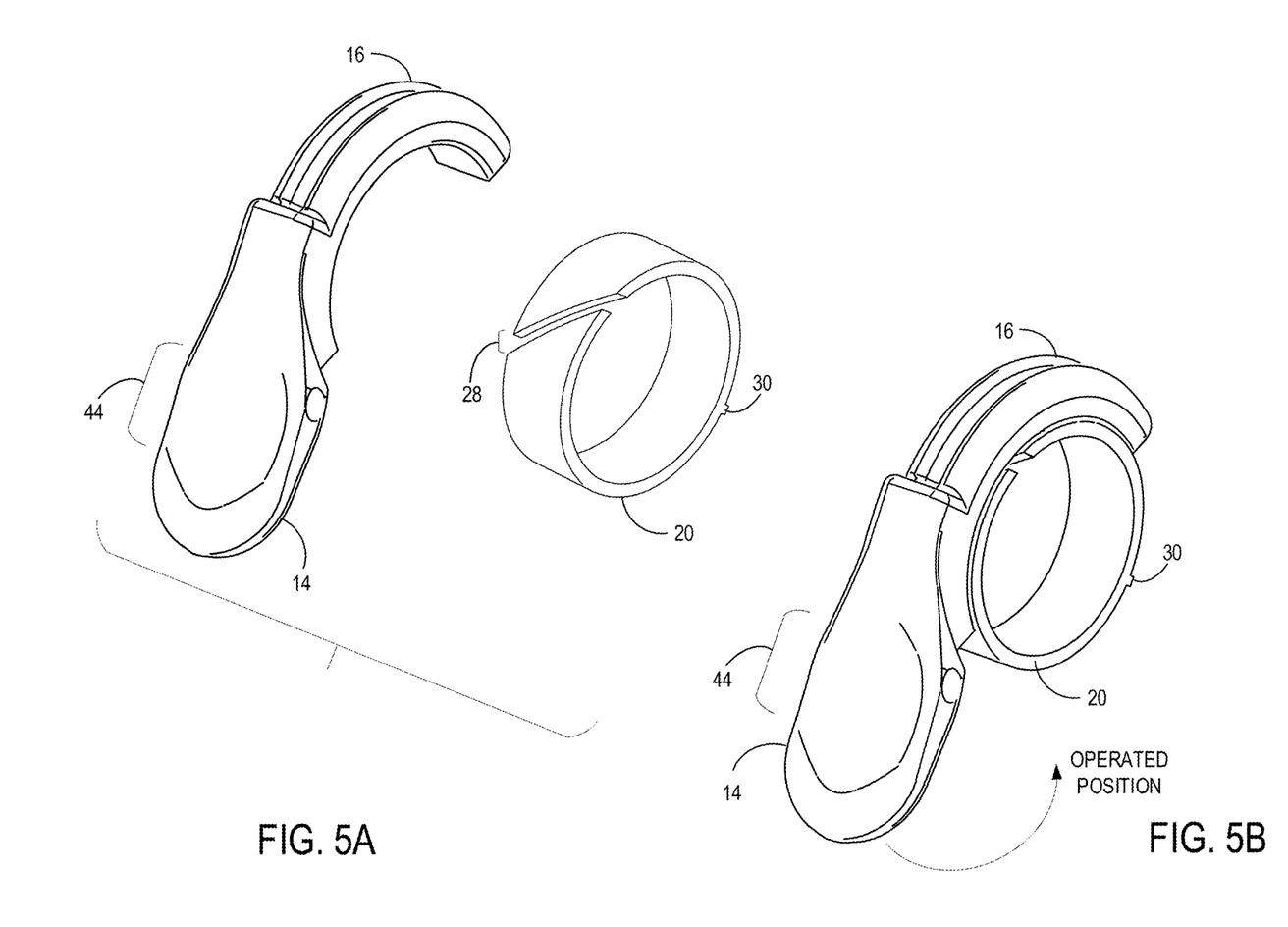
FIGS. 5A and 5B are an exploded view of the operating member and the inner member and the operating member with the inner member as placed within the control device of FIG. 3, respectively.

The connecting portion 16 of the operating member 14 is configured to be slidable within the gap 24 in the circumferential direction. FIG. 5A is an exploded view of the operating member 14 and the inner member 20; FIG. 5B shows how the operating member 14 and the inner member 20 are arranged when placed within the control device 10. FIG. 5B shows how the connecting portion 16 of the operating member 14 slides around the inner member 20 in a circumferential direction of the inner member 20.

Figure 6A:
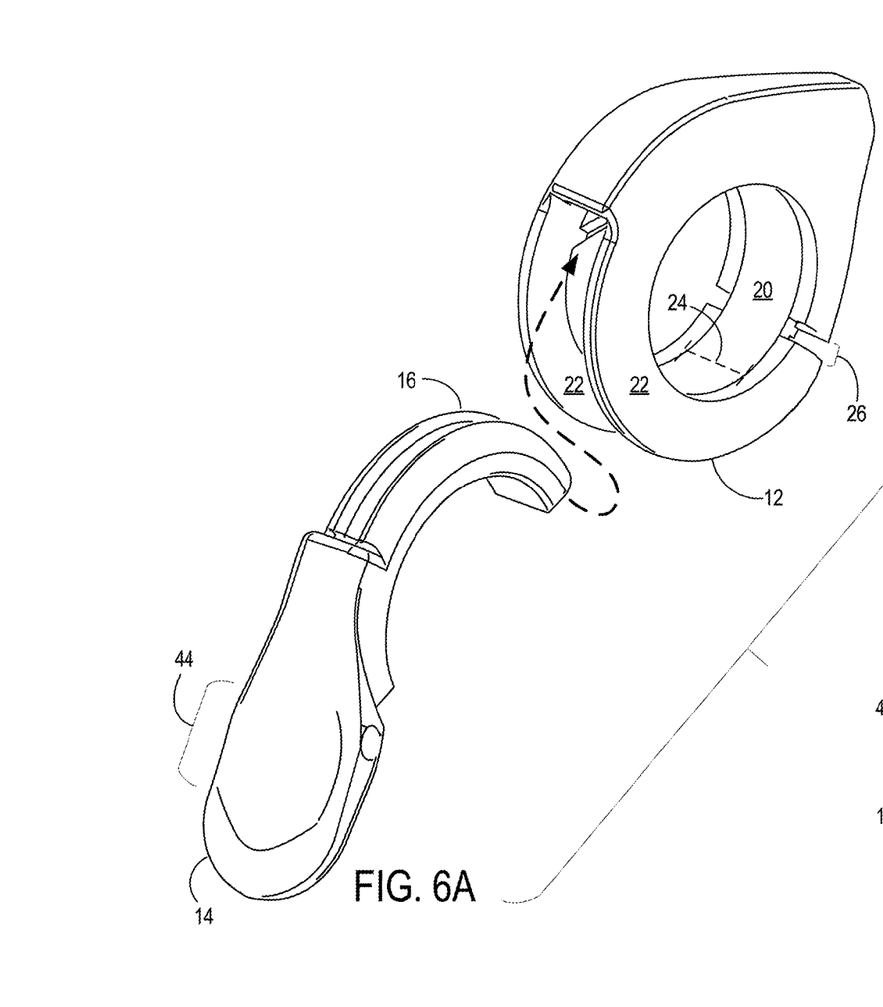
FIGS. 6A and 6B are an exploded view of the operating member and the base member and the base member with the operating member as placed within the control device of FIG. 3, respectively.
Figure 6B:
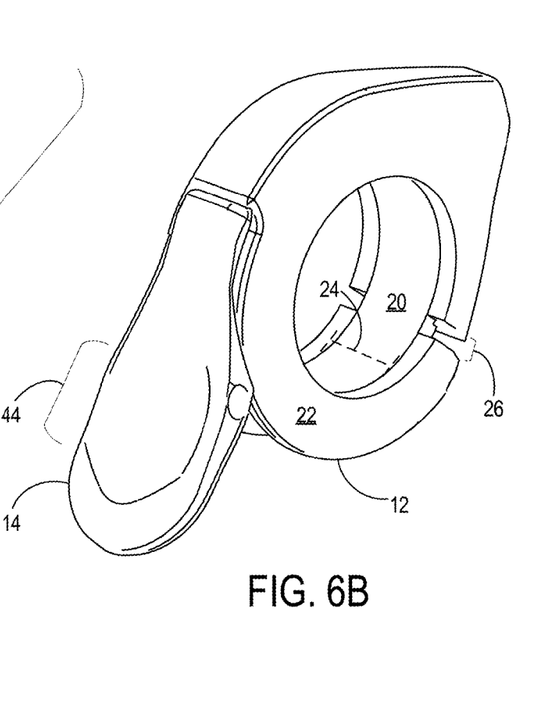

Following placing the base member 12 and the inner member 20 at a preferred position on the handlebar H, the connecting portion 16 is slid into a space between the inner member 20 and the base member 12. The connecting portion 16 of the operating member 14 is configured to be slidable between an inner circumferential surface of the base member and an outer circumferential surface of the inner member in the circumferential direction. FIG. 6A is an exploded view of the operating member 14 and the base member 12; FIG. 6B shows how the base member 12 and the operating member 14 are arranged in the assembled the control device 10. FIGS. 6A and 6B also show the inner member 20 as arranged within the base member 12. The arrow in FIG. 6A indicates the insertion direction in which the operating member 14 is rotated with respect to the base member 12 as it is inserted into the control device 10. Once inserted, the operating member 14 is arranged with respect to the control device 10 as shown in FIG. 6B. In this manner, the connecting portion 16 of the operating member 14 is at least partly arranged between the base member 12 and the inner member 20. In an alternative embodiment, the inner member 20 may be omitted and the operating member 14 may be accommodated within the gap 24, the control cable 18 securing a connection with the operating member 14.

As shown in FIG. 4, the control device includes a fastener 32 configured to be coupled with the base member 12 such that the base member 12 clamps the handlebar H. In this embodiment, the fastener 32 is applied to the base member 12 once the operating member 14 has been slid between the inner member 20 and the base member 12. Once the fastener 32 is appropriately applied, it is possible to add additional components to the base member 12 according to the embodiment as shown in FIG. 4. The control device 10 also includes a cable guide 34 having a proximate end 36 coupled to the base member 12; the control cable 18 passes through the cable guide 34. The proximate end 36 is shown in FIG. 4 placed according to this embodiment. The proximate end 36 is coupled to the base member 12 in this embodiment such that the control cable 18 is allowed to enter into the base member 12 as protected by the cable guide 34. The control device 10 also includes an adjusting member 38 attached to the cable guide 34. The control cable 18 passes through the adjusting member 38, the adjusting member 38 being configured to adjust the tension of the control cable 18.

Figure 7:
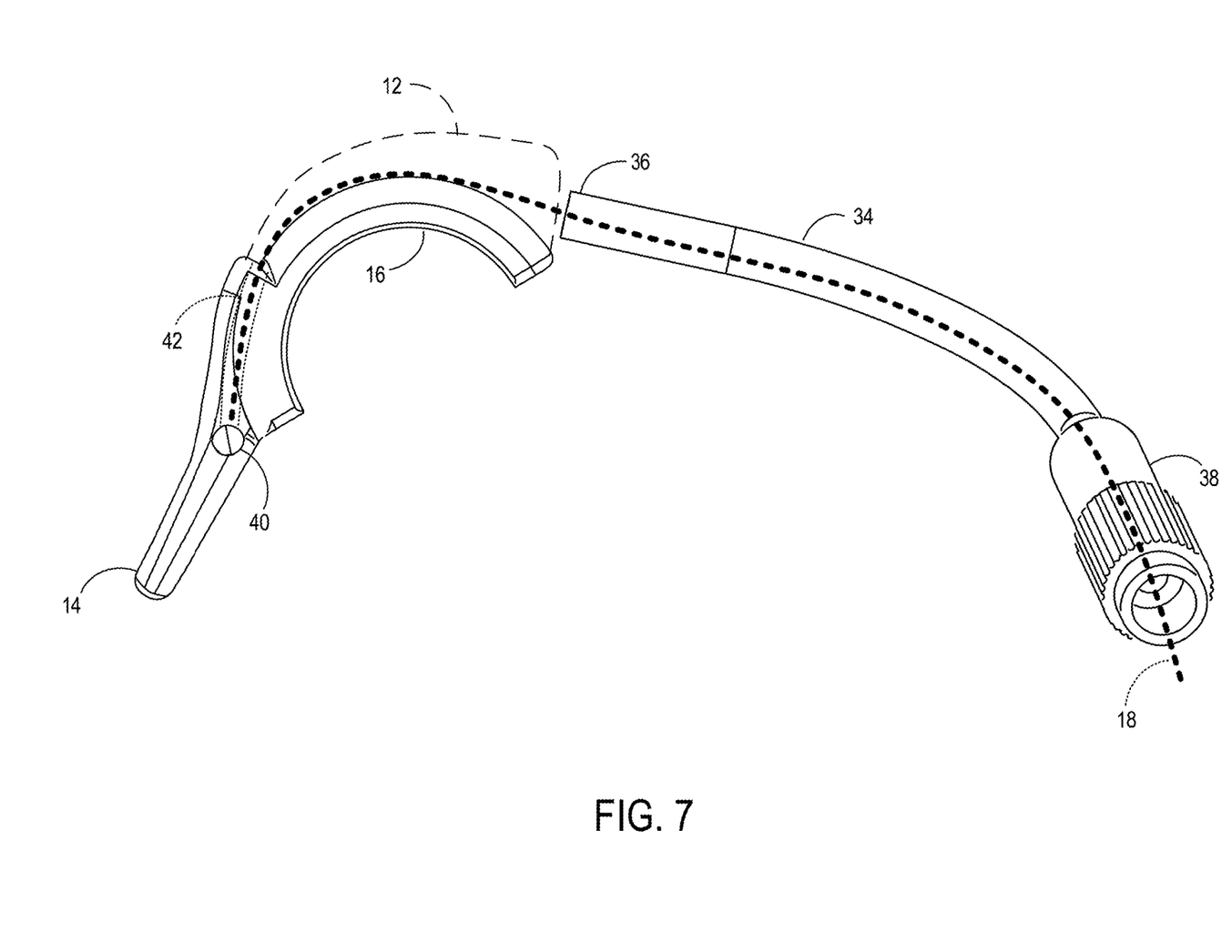
FIG. 7 is a side view of the operating member, the cable guide, the adjusting member, and the cable as indicated by a bold dashed line as placed within the control device of FIG. 3.

With the attaching of the cable guide 34 and the adjusting member 38, the control cable 18 is configured to be inserted into the base member 12 in the circumferential direction. It is possible to feed the control cable 18 from the bicycle component to be controlled by the control device 10 through the adjusting member 38, the cable guide 34, and into the base member 12 as shown in FIG. 4. FIG. 7 depicts a profile view of the control cable 18 as threaded through the adjusting member 38, the cable guide 34, and over a surface of the connecting portion 16 according to this embodiment. The control device 10 also includes a securing element 40 configured to secure the control cable 18 to the operating member 14. FIG. 4 shows securing element 40 and indicates the placement of securing element 40 into the operating member 14 with a dashed line. The profile view of FIG. 7 also shows securing element 40 as coupled to control cable 18 within operating member 14. FIG. 7 additionally presents an alternative embodiment described above where the inner member 20 is omitted and the operating member 14 is secured within the control device 10 by the control cable 18.

The operating member 14 includes a guiding slot 42 configured to guide the control cable along the circumferential direction. The guiding slot 42 is indicated in FIG. 7 in dotted lines as being internally formed within a portion of the operating member 14. FIG. 7 shows the control cable 18 as threaded into the guiding slot 42 after passing over a surface of the connecting portion 16. A dashed line indicates an upper part of the base member 12 to which the proximate end 36 of the cable guide 34 is attached according to this embodiment. The control cable 18 passes between the upper part of the base member 12 and a surface of the connecting portion 16 before entering the guiding slot 42.

The operating member 14 includes a user interface portion 44 configured to be at least partly curved. According to the embodiment shown in FIG. 4, the user interface portion 44 is configured to be at least partly curved such that it may be easily operated by a thumb or other digit of a user. In an alternative embodiment, the user interface portion 44 may include a textured surface. Other embodiments are possible; for example, a flat user interface portion 44 may include padding or other materials that are be curved or otherwise ergonomically designed. The user interface portion 44, in one example embodiment, may be centered in an axial direction relative to the connecting portion 16 of the operating member 14. In an alternative embodiment, the user interface portion 44 may be off-center in an axial direction relative to the connecting portion 16.

The base member may be made of a metallic material such as an aluminum alloy. In addition, the operating member may be made of a metallic material such as an aluminum alloy. Alternatively, a resin material such as polytetrafluoroethylene (PTFE) or a nylon such as an ultra-high molecular weight (UHMW) nylon may be used for these components. While typically the base member and operating member are made of the same material, in some embodiments, different materials may be used. The inner member may be made of a resin material such as PTFE or UHMW nylon. Other suitable resin materials such as DELRIN® acetyl resin could alternatively be used.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A control device for a human powered vehicle, comprising:
   a base member configured to clamp a handlebar, the base member defining a clamping axis in a mounted state where the base member clamps the handlebar;
   an operating member configured to be arranged by sliding movement on the base member between a rest position and an operated position in a circumferential direction of the base member, the operating member having a connecting portion to which a control cable is connected;
   wherein the operating member is removably arranged on the base member, and the operating member is positioned on the base member with a tension of the control cable, and
   wherein the connecting portion includes an open circular segment that enables the operating member to be detached from the base member in the mounted state.

2. The control device for the human powered vehicle of claim 1, further comprising:
   an inner member configured to be accommodated in the base member and to be arranged around the handlebar such that the operating member is at least partly arranged between the base member and the inner member.

3. The control device for the human powered vehicle of claim 2, wherein
   the base member includes a pair of side surfaces defining a gap therebetween, in which the inner member is arranged.

4. The control device for the human powered vehicle of claim 3, wherein
   the pair of side surfaces is configured to restrict an axial movement of the inner member.

5. The control device for the human powered vehicle of claim 3, wherein
   the connecting portion is configured to be slidable within the gap in the circumferential direction.

6. The control device for the human powered vehicle of claim 2, wherein
   the connecting portion of the operating member is configured to be slidable between an inner circumferential surface of the base member and an outer circumferential surface of the inner member in the circumferential direction.

7. The control device for the human powered vehicle of claim 2, wherein
   the inner member includes a second slit extending in a second direction non-parallel to the clamping axis.

8. The control device for the human powered vehicle of claim 7, wherein
   the inner member includes a protrusion on an outer peripheral surface that is configured to be arranged in a first slit of the base member.

9. The control device for the human powered vehicle of claim 2, wherein
   the inner member is made of a resin material.

10. The control device for the human powered vehicle of claim 1, wherein
    the base member includes a first slit extending in a first direction parallel to the clamping axis.

11. The control device for the human powered vehicle of claim 1, further comprising:
    the control cable configured to be inserted into the base member in the circumferential direction.

12. The control device for the human powered vehicle of claim 1, further comprising:
    a cable guide having a proximate end coupled to the base member, the control cable passing through the cable guide; and
    an adjusting member attached to the cable guide, the control cable passing through the adjusting member, the adjusting member being configured to adjust the tension of the control cable.

13. The control device for the human powered vehicle of claim 1, further comprising:
    a securing element configured to secure the control cable to the operating member.

14. The control device for the human powered vehicle of claim 1, wherein
    the operating member includes a guiding slot configured to guide the control cable along the circumferential direction.

15. The control device for the human powered vehicle of claim 1, wherein
    the operating member is configured to rotate through an angular range equal to or larger than 30° in response to an operation of a user.

16. The control device for the human powered vehicle of claim 1, wherein
    the operating member includes a user interface portion that is at least partly curved.

17. The control device for the human powered vehicle of claim 1, further comprising:
    a fastener configured to be coupled with the base member such that the base member clamps the handlebar.

18. The control device for the human powered vehicle of claim 1, wherein
    the base member is made of a metallic material.

19. The control device for the human powered vehicle of claim 1, wherein
    the operating member is made of a metallic material.

* * * * *